Sept. 22, 1970     A. B. DYBALA     3,529,708

ARTICLE HANDLING METHOD AND APPARATUS

Filed Dec. 5, 1967     4 Sheets-Sheet 1

INVENTOR.
AMBROSE B. DYBALA
BY Philip H. Rice
& W. A. Schaich
ATTORNEYS

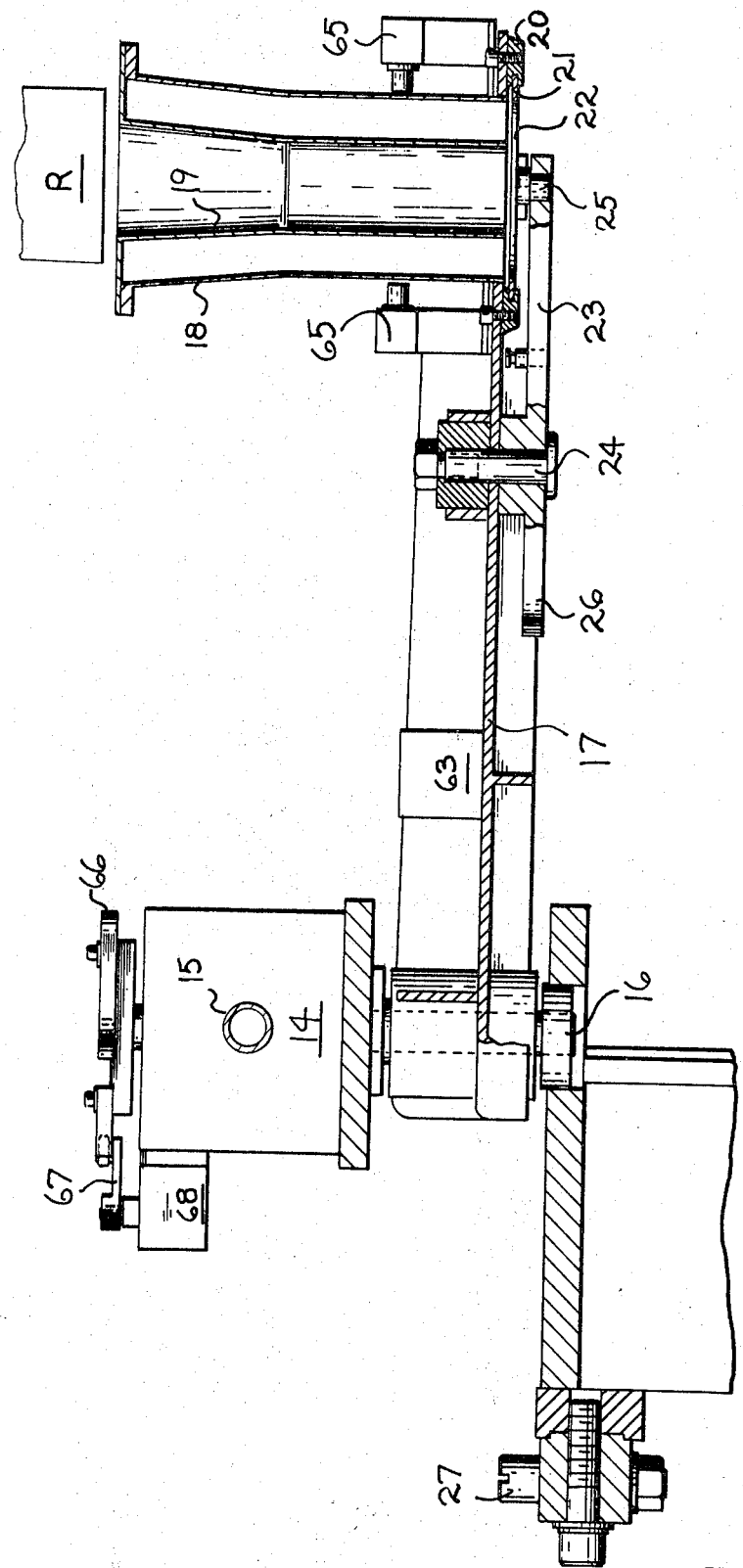

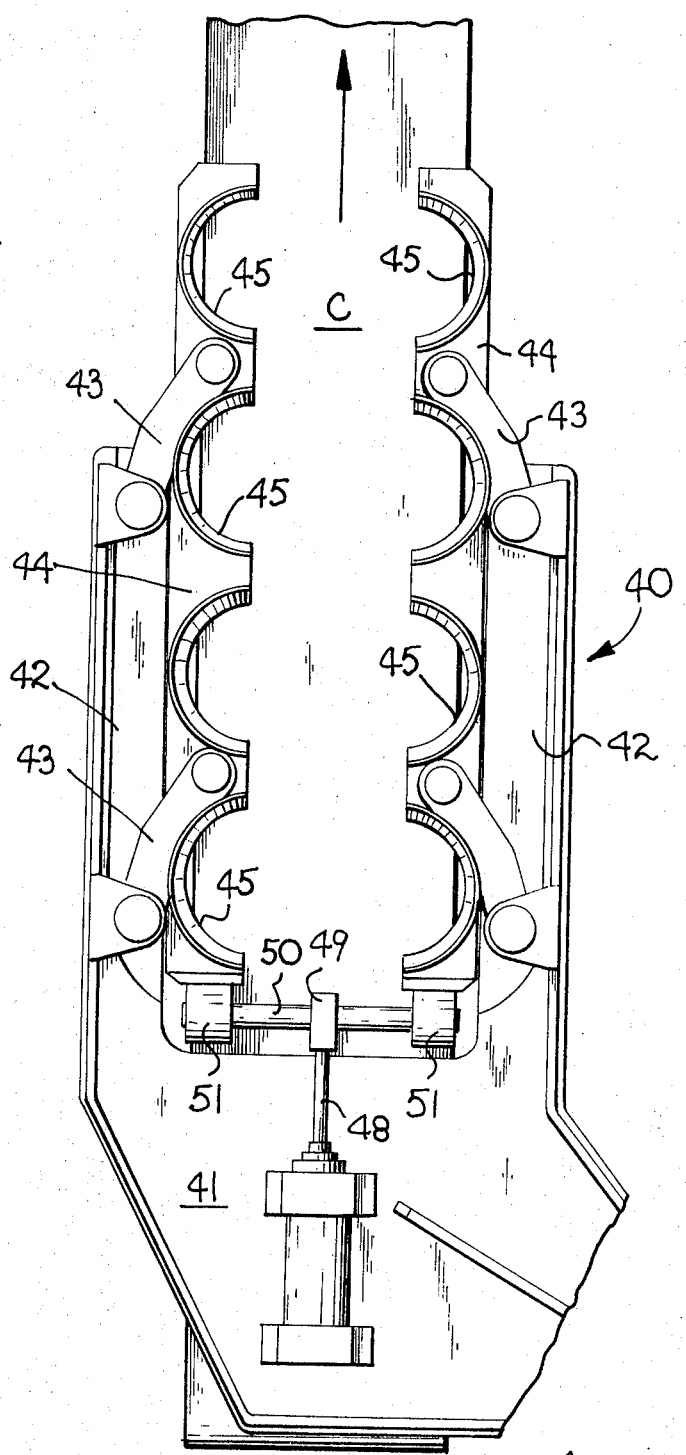

United States Patent Office 3,529,708
Patented Sept. 22, 1970

3,529,708
ARTICLE HANDLING METHOD AND APPARATUS
Ambrose B. Dybala, Toledo, Ohio, assignor to Owens-Illinois, Inc., a corporation of Ohio
Filed Dec. 5, 1967, Ser. No. 688,233
Int. Cl. B65g 47/00
U.S. Cl. 198—20
11 Claims

ABSTRACT OF THE DISCLOSURE

Apparatus is provided for removing articles from a work station and transferring them to a position overlying a moving conveyor. Means are provided for placing the articles onto the conveyor in an upright position.

SUMMARY

In the handling of articles such as newly formed plastic containers, it is desirable that such articles be maintained in an upright position at all times in order to assure their proper alignment for the next operation such as trimming, decorating, inspecting or packing in a carton. On the other hand, plastic containers, such as bottles and jugs, are particularly difficult to maintain in an upright position, especially when empty, because they frequently have a small base and a relatively great height, and are very light in weight. The present invention provides a mechanism and process for transferring such articles from a molding position or other work station to a moving conveyor while maintaining them in an upright position.

Under the present invention, the containers are received in a transfer mechanism in an upright position and maintained in that position throughout the steps of transporting them to a position overlying a moving conveyor. It will readily be appreciated that the most critical step in the transfer operation is the release of the container to the moving conveyor as any sudden movement imparted to only one end of the relatively unstable, upright container will tend to knock it over. Accordingly, under the present invention, the container is, upon release, propelled in the direction of conveyor movement at substantially the speed of the moving conveyor.

In view of the foregoing, it is an object of the present invention to provide a method and apparatus for transferring relatively unstable articles, such as plastic bottles, in an upright position from a work station to a moving conveyor.

It is a further object of the present invention to provide apparatus for releasing such articles from the transfer mechanism to the moving conveyor while simultaneously projecting them in the direction of conveyor movement.

Other objects and advantages of the present invention will become readily apparent from the following detailed description taken in conjunction with the annexed sheets of drawings on which:

FIG. 3 is a sectional view taken through line 3—3 of FIG. 1 showing the transfer arm and associated mechanism carried thereby.

FIG. 4 is a view similar to FIG. 3 showing, in an open position, the mechanism for releasing the articles to the conveyor.

Figure 1:
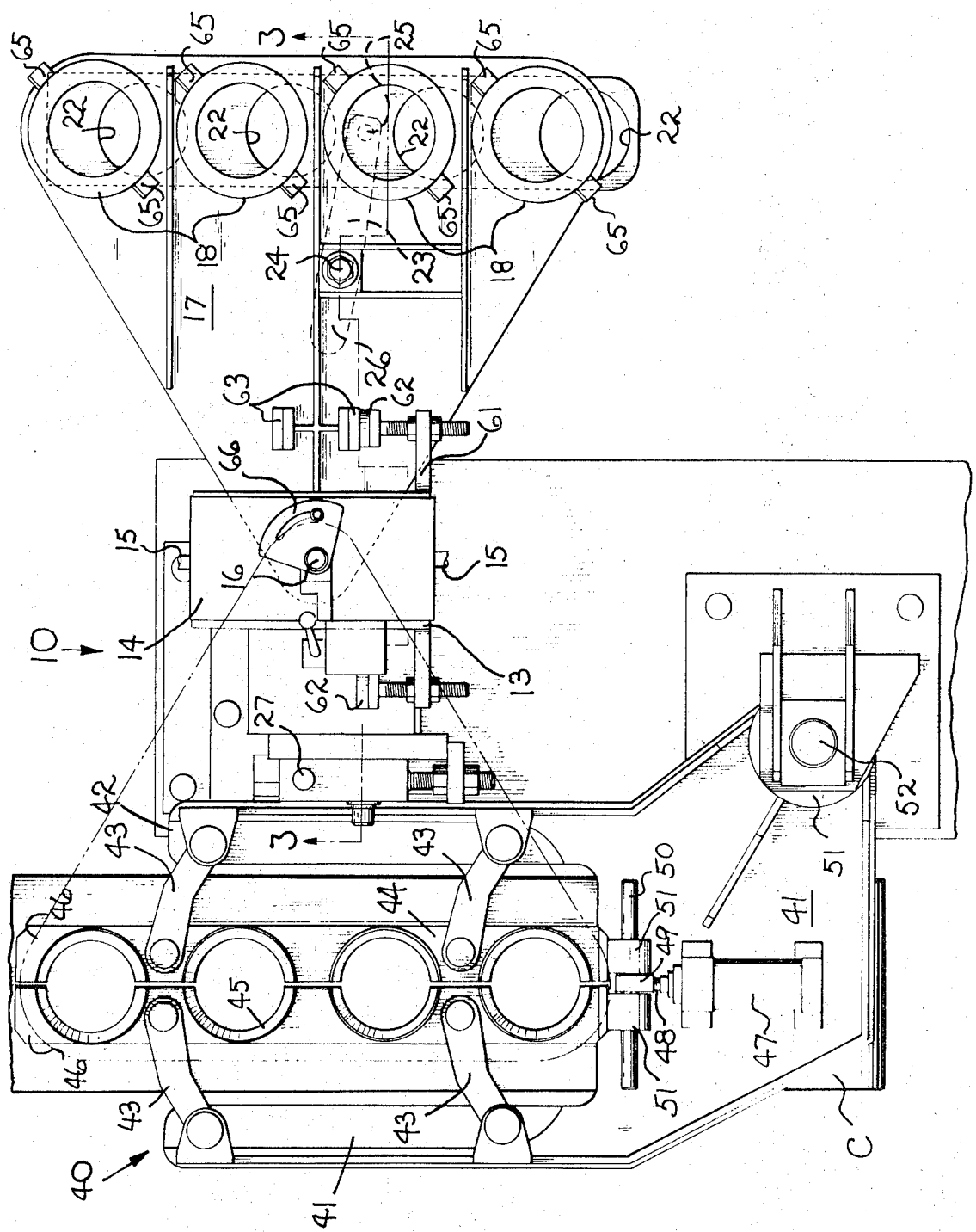
FIG. 1 is a top plan view showing the transfer mechanism in position to receive the containers from a blow molding machine or other work station.
Figure 2:
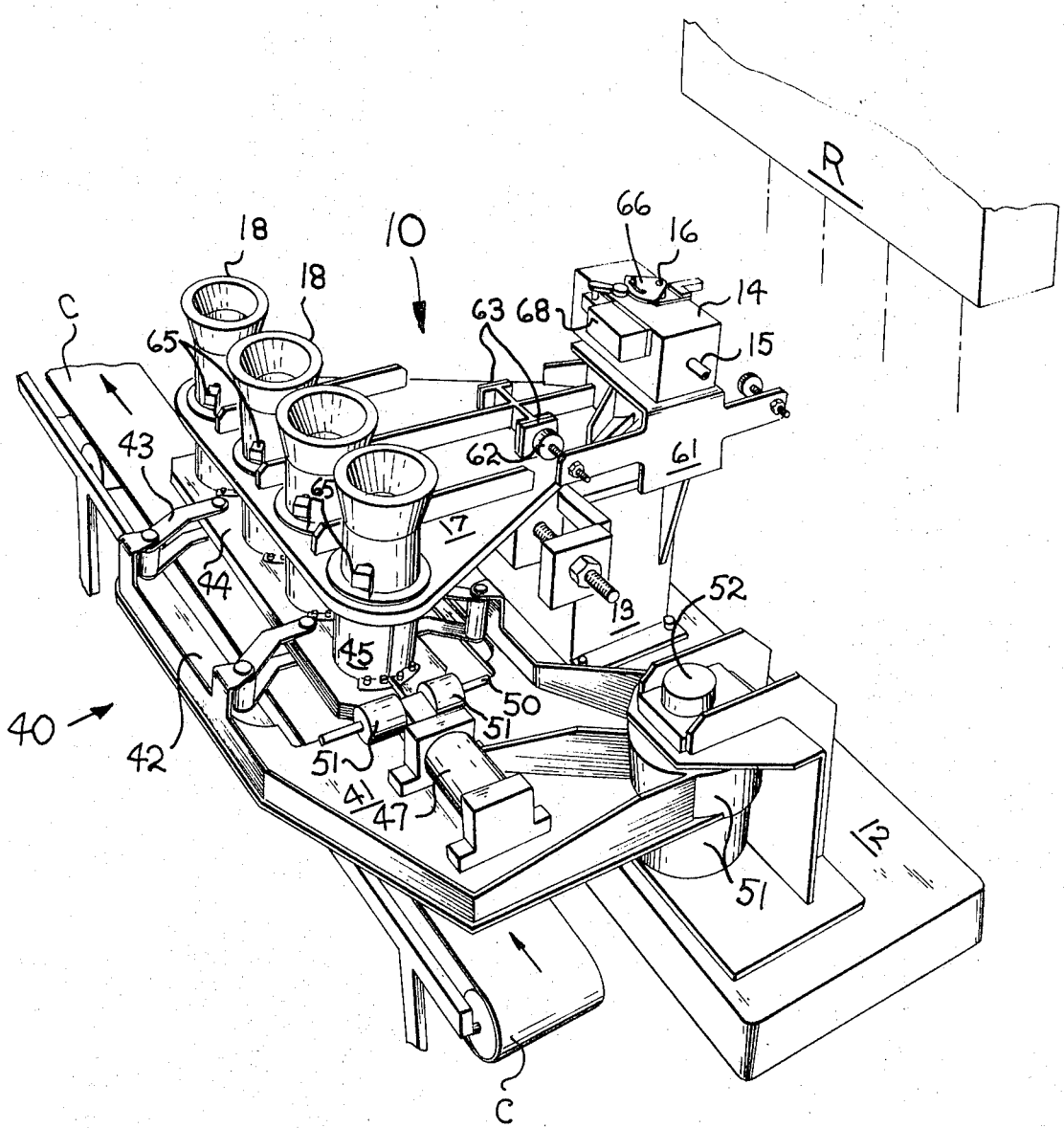
FIG. 2 is a persepective view of the transfer mechanism upon completion of the step of transferring the containers to a position overlying the conveyor.

Referring now to FIG. 1 and 2, there is provided a a takeout device generally designated by the numeral 10 comprising a base portion 12 carrying a pedestal 13 on which is positioned a rotary actuator 14. The rotary actuator 14 is a commercially available device manufactured by the Bellows-Valvair Company, Akron, Ohio, Catalog No. B–471–006, and forms no part of the present invention. Rotatably carried by the actuator 14 is a shaft 16. The actuator 14 is powered by means of pressured fluid introduced into ports 15 at opposite ends thereof. The direction of rotation of the shaft 16 is determined by which of the ports 15 pressured fluid is fed into.

Secured to the rotatable shaft 16 for movement therewith is a triangular shaped arm 17 having a plurality of sleeve members 18 mounted on the free end thereof. Rotation of the shaft 16 causes the triangular arm 17 carrying the sleeve members 18 to rotate from a position underlying a receiving station designated by the numeral R to a position overlying a conveyor C which is continuously moving in the direction indicated by the arrow in FIG. 2. Each of the sleeves 18 may be provided with one of several different size inserts 19, with the size and configuration of the insert depending on the size and configuration of article to be transferred. (See FIG. 3.) The insert may be omitted completely when the size of the articles to be transferred approximates the diameter of the sleeve 18.

Carried on the triangular arm 17 in a position directly beneath the sleeve members 18 is a plate member 21 having a plurality of apertures 22. The plate member 21 is retained in grooves formed in retaining members 20 secured to the end of the arm 17. The plate member 21 is slideable in such grooves from a normal position (FIG. 1) in which the apertures 22 are offset slightly with repsect to the sleeve members 18 to a position in which the apertures 22 are aligned therewith. The apertures 22 are substantially the same diameter as the diameter of the bottom portion of the sleeve members 18 and thus function to permit an article positioned in the sleeve to fall therethrough when the apertures 22 are aligned with such sleeve members or the inserts 19 positioned therein. When the plate member 21 is positioned so that the apertures 22 are offset slightly with respect to the sleeve members 18, as illustrated in full lines in FIG. 1, the articles positioned in such sleeve members will be retained therein, resting upon the plate member 21.

Movement of the plate member 21 with respect to the sleeves 18 is effected by means of a lever 23 pivotally mounted to the arm 17 at a pivot point 24 and having one end rotatably secured to the plate member 21 by means of a rotatable connection 25. As will be noted, the opposite end 26 of the lever 23 extends past the pivot point 24. Upon rotation of the triangular arm 17 to a position overlying the conveyor C, such opposite end 26 engages a stop pin 27 causing the lever 23 to pivot thereby sliding the plate member 21 relative to the sleeve members 18 to align the respective apertures 22 therewith. This is the position of the arm 17 shown in FIG. 2 and in phantom lines in FIG. 1.

Mounted in a position immediately above the conveyor C but below the plane of the triangular arm 17, is an ejection mechanism generally designated by the numeral 40. The ejection mechanism 40 includes a support member 41 having a pair of parallel arms 42 extending outwardly therefrom. Connected to the respective arms 42 by pivotal link members 43 are plates 44. Each of the plates supports one or more semi-cylindrical members 45, the opposite pairs of which cooperate when the plates are in a closed position (FIGS. 1 and 2) to define a tubular receiver. The semi-cylindrical members 45 and, hence, the tubular receivers defined thereby when closed, are open-ended at both bottom and top. Thus, such members when so positioned can receive articles dropped therein from the sleeve members 18. Such articles will rest upon the moving conveyor C but will be prevented from moving therewith as long as the semi-cylindrical members 45 are closed.

The semi-cylindrical members 45 are movable through a parallel motion movement from such closed position (FIGS. 1 and 2) to an open position (FIG. 4) by means of a fluid pressure cylinder 47 having a piston rod 48 extending therefrom. The free end of the piston rod 48 has a connecting sleeve 49 on which is mounted a rod member 50 slideably engaged to connecting sleeves 51 secured to the respective plates 44.

As will be noted from the drawings, the link members 43 and plates 44 are so positioned that the movement of the plates 44 to an open position by means of the fluid pressure cylinder serves both to open the semi-cylindrical member 45 and impart a forward lineal movement thereto. Thus, an article positioned therein is projected in a linear path in the direction of conveyor movement upon release. The speed of movement of the piston rod 48 can be varied by adjusting the input of fluid to the cylinder 47 to obtain optimum speed in the projecting of the articles upon release in accordance with the speed of the conveyor to insure that the articles thus released remain upright.

The ejection mechanism is pivotally supported on the base 12 by means of hubs 51 and connecting pin 52. Such construction permits the ejection mechanism to be swung out of the way of the conveyor and the rest of the take-out device in order that maintenance can easily be performed thereon. Additionally, it permits the remainder of the take-out device to continue to operate to at least transfer articles from the receiving station to the conveyor in the event of a break down to the ejection mechanism 40.

As previously noted, the triangular shaped arm 17 rotates from a position underlying the receiving station R to a position overlying the conveyor C about rotatable shaft 16. Such movement is in a counterclockwise direction and the movement from the conveyor to the receiving station is in a clockwise direction.

Mounted on one side of the rotary actuator 14 is a plate 61 carrying on opposite ends thereof stop members 62. Positioned on the arm 17 are a pair of stop members 63 which are aligned to abut the respective stop members 62 when the arm 17 is at the opposite ends of its oscillating positions. The stop members 62 are adjustable to insure that the sleeve members 18 will be properly positioned upon stopping of oscillation of the arm 17.

If desired, photocells 65, or other articles detecting devices, may be positioned on each of the sleeves 18. Such photocells function to actuate the rotary actuator 14 which turns the arm 17. Also carried on the shaft 16 with the arm 17 is a cam member 66 which is positioned to engage an arm 67 extending from a limit switch 68 mounted on the housing of the rotary actuator 14.

Beginning with the apparatus in the position illustrated in FIGS. 1 and 3, one complete cycle of operation will be described. In the position as illustrated in FIGS. 1 and 3, the arm 17 is positioned so that the sleeve members 18 are beneath the article receiving station R. Articles are dropped by gravity from the receiving station R and fall into each of the sleeves 18. The presence of such articles in the sleeves 18 is detected by the photocells 65 and relayed to any conventional control mechanism which causes a pressure source to introduce fluid pressure into the proper port 15 of the rotary actuator 14 to cause the shaft 16 and arm 17 carrying the sleeve members 18 to rotate in a counterclockwise direction. As the arm 17 reaches a position in which the sleeves 18 overlie the respective sets of closed semi-cylindrical members 45, cam member 66 engages arm 67 to actuate limit switch 68 thereby stopping the flow of fluid pressure to the rotary actuator 14 and stopping the arm 17 in the proper rotative position. Additionally, as previously noted, one of the stop pins 63 carried by the arm 17 engages one of the stop pins 62 held by the stationary plate 61 thereby insuring that the arm 17 stops at precisely the proper location. As the arm 17 approaches the end of its rotational movement overlying the ejector mechanism 40, the opposite end 26 of the lever 23 engages the stop pin 27 to pivot such lever and slide the plate member 21 into a position in which the apertures 22 are aligned with the sleeve members 18, thus permitting the articles carried by such sleeve members 18 to fall into the closed semi-cylindrical members 45. The photocells 65, upon detecting the absence of articles in the sleeves 18, emit a signal causing pressured fluid to be directed to the opposite port 15 of the rotary actuator 14 to cause such rotary actuator to return the arm 17 in a clockwise direction so that the sleeves 18 again underlie the receiving station R. At any time after the articles are positioned in the tubular receiver, the fluid pressure cylinder 47 may be actuated by any desired means to extend the rod 48 thereby opening the plates 46 and the semi-cylindrical members 45 carried thereby. Such opening releases the articles and imparts thereto a lineal movement in the direction of conveyor movement.

It can be readily seen from the foregoing that the present invention provides a method and apparatus for transferring articles in an upright oriented position from a receiving station to a remotely located conveyor and for depositing such articles on the conveyor in an upright position.

Although the present invention has been described in conjunction with one specific embodiment, it will be readily recognized that several modifications will become apparent to those skilled in the art. For example, it would be possible, and is within the scope of the present invention, to utilize a straight lineal movement for transfer of the sleeves 18 from the receiving station R to the conveyor C. The scope of this invention should, therefore, be limited not by the specific embodiment disclosed but rather by the claims appended thereto.

I claim:

1. Apparatus for tranferring articles from a work station to a remote position comprising
    an open-ended sleeve for receiving said articles at said work station,
    a plate positioned beneath said sleeve, said plate being movable relative to said sleeve from a first position for retaining articles therein to a second position permitting said articles to fall by gravity from said sleeve, said plate being formed with at least one aperture sized to permit articles to pass therethrough, said aperture being aligned with said sleeve when the plate is in said second position and being at least partially out of alignment with said sleeve when the plate is in said first position,
    means for moving said sleeve and said plate from said work station to said remote position,
    and means for moving said plate from said first to said second position.

2. The apparatus as defined in claim 1 further including an ejector mechanism positioned beneath said plate means, said ejector mechanism including a pair of article restraining members mounted for movement between an open and a closed position, said restraining members, when closed, encircling articles dropped therein and preventing horizontal movement thereof, the movement of said restraining members from a closed to an open position projecting the encircled article in a horizontal direction, and means for moving said restraining members from a closed to an open position.

3. The apparatus as defined in claim 2 including a moving conveyor positioned beneath said restraining members, an article encircled by said restraining members resting on the moving conveyor, the projection of said articles upon opening of said restraining members being in the direction of conveyor movement.

4. The apparatus as defined in claim 2 wherein said restraining members are mounted on parallel plates and said plates are mounted to follow a parallel motion when moved between said open and closed positions.

5. Apparatus for removing articles from a work station and placing them on a moving conveyor in an oriented position comprising
   (a) at least one sleeve for receiving said articles, said sleeve having article retention means associated therewith for supporting said articles therein,
   (b) means supporting said sleeve for movement from a position underlying said work station to a position overlying said conveyor and
   (c) ejection means over said conveyor in a position to receive articles from said sleeve, said ejection means including a pair of members cooperating when in a closed position to define an article restraining structure, means mounting said members for movement between a closed position retaining said articles and an opened position releasing said article, the movement of said members from said closed position to said opened position imparting a movement to the article being released in the direction of movement of said conveyor.

6. The apparatus as defined in claim 5 wherein said article retention means comprises (1) a plate slideably mounted beneath said sleeve, said plate having at least one aperture, said aperture sized to permit articles to fall therethrough when aligned with sleeve and (2) means for sliding said plate from a position in which the aperture is out of alignment with said sleeve to a position in which the aperture is aligned with said sleeve.

7. Apparatus for transferring articles from a work station to a moving conveyor and placing said articles on said conveyor in an upright position comprising
   sleeve means for receiving said articles from said work station,
   means for transferring said sleeve means from a first position adjacent said work station to a second position overlying said conveyor,
   a plate positioned beneath said sleeve means and cooperable therewith to retain the article therein during transfer from said first to said second positions,
   means for moving said plate relative to said sleeve while at said second position to release the article from said sleeve,
   and article retaining means overlying said conveyor in a position to receive said articles from said sleeve means upon release thereof, said article retaining means including a pair of sections cooperable when closed to hold the article in an upright position over the conveyor, means mounting said sections for movement from a closed position to an open position, the movement of said sections from the closed to the open position releasing the articles and simultaneously imparting thereto motion in the direction of conveyor movement.

8. The method of transferring articles from a receiving station to a moving conveyor comprising the steps of
   (a) receiving said articles in an upright position at said receiving station,
   (b) transferring said articles while upright to a position overlying said conveyor,
   (c) dropping said articles into contact with said conveyor, and
   (d) releasing said articles to said conveyor while simultaneously imparting thereto a movement in the direction of conveyor movement.

9. The method as defined in claim 8 further including the step of momentarily restraining said articles from movement between said dropping step and step (c).

10. Apparatus for positioning articles on a moving conveyor in an upright position comprising,
    a pair of members movable between open and closed positions, said members cooperating when closed to at least partially encircle an article positioned therebetween,
    means mounting said members for movement between said positions, the movement from the closed to the open position imparting a horizontal movement to the article as it is released,
    and means for moving the members between said positions.

11. The apparatus as defined in claim 10 wherein said members are mounted on parallel plates and said plates are mounted to follow a parallel motion when moved between said open and closed positions.

References Cited

UNITED STATES PATENTS

| 1,846,009 | 2/1932 | White et al. | 198—22 |
| 3,025,638 | 3/1962 | Krawetzke et al. | 214—1 X |
| 3,229,803 | 1/1966 | Reynolds | 198—26 |
| 3,272,508 | 9/1966 | Dowd et al. | 198—22 X |

RICHARD E. AEGERTER, Primary Examiner

D. D. WATTS, Assistant Examiner